P. MAGGIO.
GAS HOSE ATTACHMENT.
APPLICATION FILED NOV. 30, 1907.
911,250.
Patented Feb. 2, 1909.
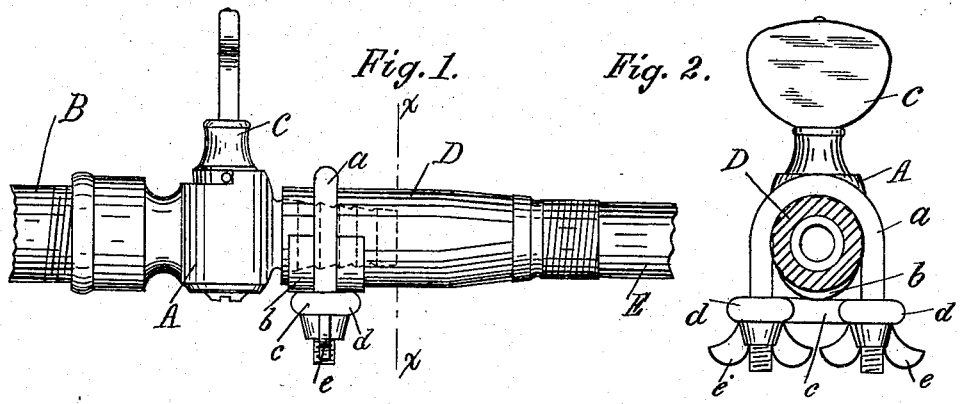
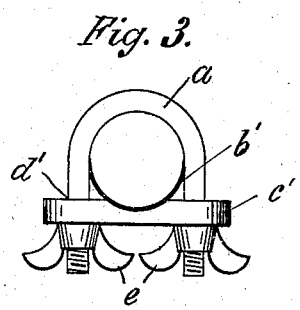
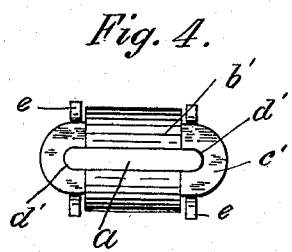
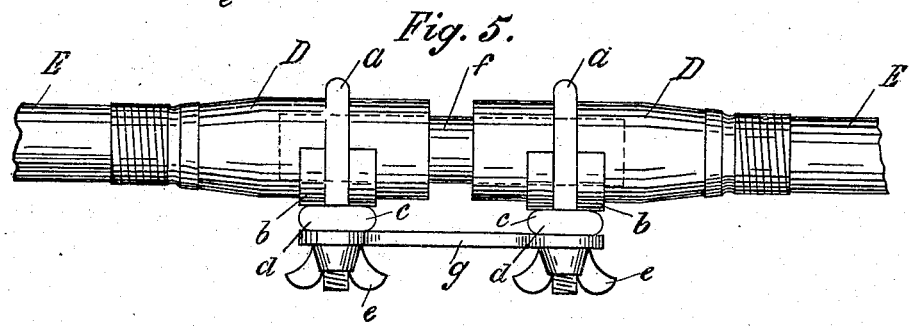
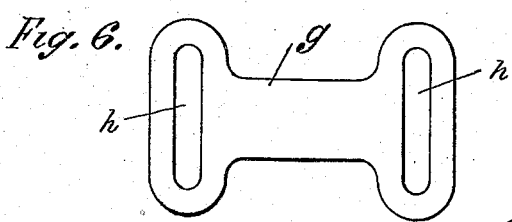
Witnesses:
D. J. Wickers
Samuel Young
Paolo Maggio
Inventor
By his Attorney
S. Charles Yeaton.

UNITED STATES PATENT OFFICE.

PAOLO MAGGIO, OF NEW YORK, N. Y.

GAS-HOSE ATTACHMENT.

No. 911,250.   Specification of Letters Patent.   Patented Feb. 2, 1909.

Application filed November 30, 1907. Serial No. 404,546.

*To all whom it may concern:*

Be it known that I, PAOLO MAGGIO, a citizen of the United States, and a resident of New York city, borough of Brooklyn, county of Kings, and State of New York, have invented new and useful Improvements in Gas-Hose Attachments, of which the following is a specification.

My invention relates to a fastening device constructed as will be hereinafter more fully described and which may be used for better securing (1) gas hose to the usual gas hose fitting as found on gas piping, gas stoves, ranges, etc. (2) for securing two lengths of gas hose together. (3) for securing together the ends of a broken gas hose, and (4) for use in patching a leaky hose.

Referring to the drawings: Figure 1 shows my invention constructed to best adapt it for securing a gas hose to the nozzle of a gas cock. Fig. 2 is a sectional view of Fig. 1 taken through the plane x—x. Fig. 3 is a similar view as Fig. 2 showing a slight modification, and with the gas hose and fixtures eliminated. Fig. 4 is a plan view of Fig. 3. Fig. 5 shows the manner of using my invention for connecting two lengths of hose. Here two fastening devices are used, and also an inner tube or nipple for connecting the lengths. A tie or spacer is also shown which facilitates a surer holding of the ends of the hose together (although this may be dispensed with if desired,) and Fig. 6 is a plan view of the tie or spacer.

My invention is principally for use on gas hose but it may also be used on garden water hose, or even for larger hose, as, for instance, a fire company's hose.

The gas fitting in general use for connecting the gas pipe leading from the gas main with the gas hose is provided with a turn-key and has one end screw-threaded internally for screwing it to the gas pipe which is provided with a corresponding external screw-thread. The other end of the fitting terminates in a tapering nozzle on to which is forced one end of the hose, the other end of which is in like manner forced on a similar fitting screwed on the pipe of the gas stove, range, heater, lamp, etc. where the gas is consumed. One type of such a fitting as is in common use is shown in Fig. 1. The tapering end of the fitting is generally given a slightly screw-threaded or wavy surface and this together with the taper given to the end is all that is relied upon for retaining the hose in place. The ordinary gas hose is generally made of rubber (or a substitute) with an inner winding of wire and covered on the outside with a tight fitting cylindrically woven fabric. To the ends of the hose are cemented or otherwise secured rubber tube couplings. These terminal tubes have neither an inner winding of wire nor outer covering and are therefore capable of stretching to fit snugly on the tapering end of the gas pipe fitting or jet, making a gas tight joint. It is found in practice however, that this rubber end soon deteriorates, especially where it is frequently pulled on and off, and soon so loosely fits the tapering end of the gas fitting that the joint becomes leaky and the gas escapes. Moreover, by a mere accident the hose is often either pulled or kicked and its connection with the jet broken which is exceedingly dangerous and as is well known has often resulted in loss of life by asphyxiation. My invention is directed to overcome this danger and is well adapted to both securely retain the hose in place, and to so snugly hold it as to prevent all leaking.

My invention may (as has already been alluded to) also be used for securing two lengths of hose together or two ends of a hose that has become hard and brittle and permanently fractured so that it has been necessary to cut the hose to remove the fractured part. Or my invention may be used where a hose has become leaky in any part. In such case before securing my device to the porous leaky spot there should first be applied some filler such as heavy syrup, soap, condensed milk or other similar substance.

In each instance where my invention may be used I slightly modify the construction to better meet the special requirements without deviating in any way from the principle involved and although each construction is best adaptable for the particular use intended they may if desired be applied to the other uses as have been described.

Figs. 1 and 2 show a gas fitting A provided with a turn-key C. The fitting is internally screw threaded at one end and screwed upon a gas pipe B, the other end (shown dotted) is tapered to engage the end D of the hose E. To prevent the hose from being accidentally pulled off as is often done by children tampering with the hose, or as is sometimes done by tripping over the hose, or where the rubber terminal (D) is old and loose, as may be done by its own weight, I provide a staple like member *a* screw-threaded at both its ends. The staple is of a size suitable to fit snugly around the end of the hose for about half of its circumference. The remainder of the circumference is spanned by a crescent like band *b*. This band is preferably made of spring metal formed to fit snugly upon the semi-circumference of the hose, and is made thick at its center and gradually tapering to a knife-edge at its ends. A spanner *c* made of stiff wire and bent at both ends to form eyelets *d—d* is mounted across the ends of the staple *a*, the ends of the staple loosely fitting within the eyelets and thumb screws *e—e* are then screwed upon the ends of the staple.

In applying my device the thumb screws and spanner are removed and the staple passed over the hose conveniently near its end, the band *b* is then brought into place on the opposite side from the yoke of the staple. The spanner is next mounted on the staple and the thumb screws screwed home, forcing the band *b* and yoke of the staple to snugly and tightly fit about the hose. The thickening of the central portion of the band *b* prevents any buckling of that member and the knife-like edges enable them to be forced well up between the legs of the staple and the gas hose and insures a complete and sure squeezing of the entire circumference of the hose.

In Figs. 3 and 4 I use a band *b′* of the same thickness throughout, and to prevent its buckling I make the spanner *c′* cylindrically concave on its upper surface which is adjacent to and supports the thin band for the greater part of its length leaving only the ends free to allow them to be forced up between the legs of the staple and the hose in a similar manner as in Fig. 2. In the band are two holes *d′—d′* at either end through which passes the ends of the staple and then the thumb-screws are screwed on in the same manner as shown in Figs. 1 and 2.

In Fig. 5 two lengths of hose are shown connected, and for this purpose a small piece of tubing *f* is used for connecting the two ends and a fastener similar to that shown in Figs. 1 and 2 is used on the end of each length of hose, although the fastener shown in Figs. 3 and 4 may equally as well be used if desired. Where such a union is made it is preferable for a better securing of the ends to use the tie or spacer *g*. This is best shown in Fig. 6 and is made from thin sheet metal or it can be made of leather. Where the ends of the hose fit the tube *f* snugly the bands *b* and spanners *c* may be dispensed with the tie *g* solely relied upon for securing the hose to the tube. In this instance the tie or spacer is preferably made of leather and of the shape shown in Fig. 6, the ends being transversely enlarged and provided with the slots *h—h* through which are passed the ends of the staple, or instead of the slots holes may be used in a similar manner as the eyelets *d—d* in spanner *c*.

Having thus described my invention I claim:

1. A hose attachment comprising a tube for insertion within the hose, staple-like members screw-threaded at their ends and provided with thumb-screws to be placed around the hose near the ends of the inner tube, bands for encircling the hose around the gaps formed by the legs of the staple-like members, spanner bars provided with holes for mounting them on the staple-like members and a spacer fitted upon the ends of the said staple-like members to prevent them from spreading.

2. A hose attachment comprising a staple-like member, screw-threaded at its ends, for encircling part of the hose, a resilient band for encircling the remainder of the hose, a spanner provided with two holes for mounting it on the ends of the staple-like member, the center of the spanner being adjacent the center of the band, and thumb-screws screwed upon the ends of the staple-like member to force it and the band tightly around the hose.

3. A hose attachment comprising a staple-like member screw-threaded at its ends for encircling part of the hose, a resilient band thickened at its center and knife edged at its ends for encircling the remainder of the hose, a spanner provided with two holes for mounting it on the ends of the staple-like member, the center of the spanner being adjacent the thickened portion of the said band, and thumb-screws screwed upon the ends of the staple-like member to force the staple and band tightly around the hose.

4. A hose attachment comprising a tube for insertion within the hose, staple-like members screw-threaded at their ends and provided with thumb-screws to be placed around the hose near the ends of the tube, bands for encircling the hose around the gaps formed by the legs of the staple-like members, spanner bars provided with holes for mounting them on the staple-like members to force them and the bands tightly around the hose when the thumb-screws are tightened.

PAOLO MAGGIO.

Witnesses:
VICTOR LIOTA,
PIETRO SANZONE.